United States Patent [19]

Nikoh

[11] Patent Number: 5,124,786
[45] Date of Patent: Jun. 23, 1992

[54] COLOR SIGNAL ENHANCING CIRUCIT FOR IMPROVING THE RESOLUTION OF PICTURE SIGNALS

[75] Inventor: Hidemitsu Nikoh, Tokyo, Japan

[73] Assignee: NEC Corporation, Tokyo, Japan

[21] Appl. No.: 573,374

[22] Filed: Aug. 27, 1990

[30] Foreign Application Priority Data

Aug. 30, 1989 [JP] Japan ................. 1-226091

[51] Int. Cl.$^5$ ............................................. H04N 9/68
[52] U.S. Cl. ................................ 358/37; 358/27; 358/36; 358/166
[58] Field of Search ................ 358/37, 27, 36, 166, 358/167

[56] References Cited

U.S. PATENT DOCUMENTS

| | | | |
|---|---|---|---|
| 3,816,846 | 6/1974 | Leroy et al. | 358/28 |
| 4,337,479 | 6/1982 | Tomimoto et al. | 358/37 |
| 4,766,487 | 8/1988 | Tanaka et al. | 358/37 |
| 4,870,481 | 9/1989 | Kawamata | 358/31 |

OTHER PUBLICATIONS

"TV Society Technology Report", TEBS 96-5, publsihed May 24, 1984.

Primary Examiner—James J. Groody
Assistant Examiner—Minsun Oh
Attorney, Agent, or Firm—Laff, Whitesel, Conte & Saret

[57] ABSTRACT

A color-signal enhancing circuit of the invention comprises a pair of first and second high-pass filters, a control circuit, and a pair of first and second gain controllers. The high-pass filters provide a predetermined frequency region restriction to color difference signals. The control circuit may comprise a first and second gain controllable amplifiers which provide a predetetermined coefficient to outputs from the high-pass filters, an adder which adds outputs from the first and second amplifiers, and a convertor which provides to an output of the adder a coefficient calculated in a predetermined operation in accordance with the polarity of input signals inputted thereto. In an alternative arrangement, a pair of the high-pass filters may be replaced by a pair of low-pass filters. The gain control signal is obtained from the information on high frequency components or on low frequency components of color difference signals and, with this single gain control signal, the gains of the color difference signals inputted are controlled, whereby it is possible to enhance color signals in such a way that there will be no appearance of false colors at turning points of color changing.

6 Claims, 3 Drawing Sheets

COLOR SIGNAL ENHANCING CIRUCIT FOR IMPROVING THE RESOLUTION OF PICTURE SIGNALS

BACKGROUND OF THE INVENTION

The present invention relates to a color-signal processing circuit and, more particularly, to a color-signal enhancing circuit which compensates color signals in electronic camera signal processing so that the deterioration in the resolution of the picture images is prevented.

Conventionally, for the purpose of preventing the deterioration in the resolution of the picture images, the process of compensating color signals in electronic camera signal processing has been applied mostly to luminance signals only and, even in the instances where such process is applied to color signals it has been applied independently to the primary-color signals of each of red, blue and green signals.

In the conventional signal compensating process such as that referred to above, the red, green and blue signals (hereinafter respectively referred to as "R", "G" and "B") inputted to input terminals and the signals having passed through high-pass filters are respectively added by adders for effecting compensation of a deterioration of color signals for each color independently.

The problem in the conventional process referred to above is that, since the signals R, G and B are individually processed, when a change takes place only in the signal R, for example, among the signals R, G and B, there occurs a large change in the rising and falling of signal wave-forms of R alone. Thus, if the signals R, G and B are mixed at a predetermined ratio in order to produce a luminance signal and color difference signals ("R—Y" and "B—Y"), the balance of the color difference signals produced based on the signals R, G and B fluctuates thereby causing the appearance of a false color.

SUMMARY OF THE INVENTION

It is, therefore, an object of the invention to overcome the problem existing in the conventional arrangements and to provide an improved color-signal enhancing circuit.

One of the main objects of the invention is to provide a color-signal enhancing circuit with which, without the primary-color signals R, G and B being processed independently, the mean value of certain frequency components of the color difference signals is obtained and, by a convertor, is converted into a single gain control signal which is used for effecting gain controlling of each of the color difference signals R—Y and B—Y. This signal gain control signal can be relied upon for changing color saturation without changing the hue.

According to one aspect of the invention, there is provided a color-signal enhancing circuit which comprises:

a pair of first and second input terminals which respectively receives input color difference signals based on certain image signals;

a pair of first and second frequency region restricting means each of which gives restrictions of a predetermined frequency region to each of the respective color difference signals;

a control circuit which receives outputs from the first and second frequency region restricting means and produces a gain control signal; and a pair of first and second gain control means each of which effects gain-controlling of each of the input signals by using the gain control signal outputted from the control circuit, whereby, with each of the first and second gain control means being controlled by the common and single gain control signal, the color signals based on the image signals inputted are enhanced.

Thus, according to the present invention, a single gain control signal is obtained from the information of color difference signals R—Y, B—Y from such as an electronic camera and high frequency components or low frequency components thereof, the gains of the color difference signals R—Y, B—Y are similarly controlled by the use of the resultant single gain control signal, whereby it is possible to effectively enhance color signals in such a way that there will be no appearance of false colors at turning points of color changing.

The exemplifications set out herein illustrate the preferred embodiments of the invention and such exemplifications are not to be construed as limiting in any manner.

PREFERRED EMBODIMENTS OF THE INVENTION

Throughout the following explanation, similar reference symbols or numerals refer to the same or similar elements in all the figures of the drawings.

For the purpose of assisting in the understanding of the present invention, a conventional color-signal enhancing circuit and the problems existing therein will first be described by making reference to FIG. 5 before the present invention is explained.

Figure 5:
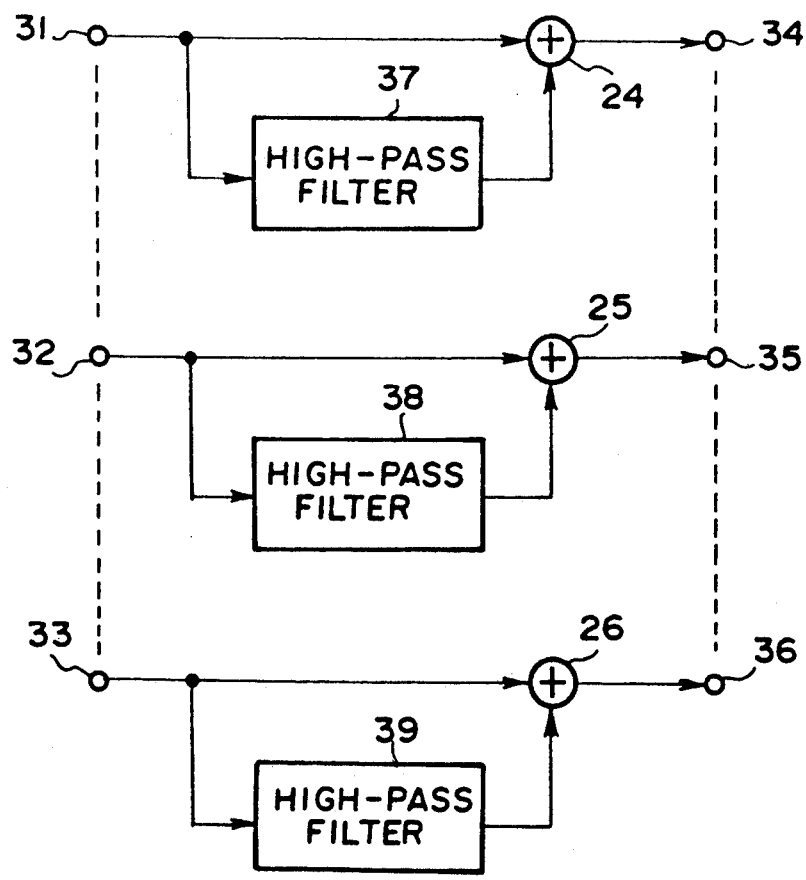
FIG. 5 is a block diagram showing a conventional color-signal enhancing circuit.

FIG. 5 shows in a block diagram an example of a conventional color-signal enhancing circuit. In this example, a signal from each of input terminals 31-33 and a signal having passed through each of high-pass filters 37-39 are added at each of adders 24-26 and the resultant signal is outputted from each of output terminals 34-36.

In the conventional circuit described above, the input terminals 31-33 receive from a signal processing circuit in, for example, an electronic camera respective outputs of a red signal, a green signal and a blue signal (R, G and B) based on certain picture images. Each of the high-pass filters 37-39 extracts high frequency components of each of the primary-color signals R, G and B. Each of the resultant signals is added to each of the original signals by each of the adders 24-26. In this method, the necessary compensation for a deterioration in the resolution is effected independently for each color. Reference to such a method is found in, for example, "TV Society Technology Report" TEBS 96-5, published May 24, 1984.

In the conventional signal processing circuit referred to above, since the primary-color signals R, G and B are separately and independently treated, it so happens that, when a change takes place only, for example, in the signal R out of the signals R, G and B, there occurs a large change in the signal R in its rising and falling wave shapes. Therefore, when the luminance signal and the color difference signals (R−Y, B−Y) are to be produced by mixing the signals R, G and B at a certain fixed ratio, there will be a change in the balance of the color difference signals produced based on the signals R, G and B, which causes the appearance of a false color.

The present invention provides a color-signal enhancing circuit which overcomes the above problem and in which, without the primary-color signals R, G and B being treated, the mean value of certain frequency components of the color difference signals is extracted and then numerically converted into a single gain control signal by a circuit comprising a pair of filters, a pair of gain controllable amplifiers and a convertor, and the value of the resultant single gain control signal is used for gain controlling each of the color difference signals R−Y and B−Y. This enables to vary only the color saturation without changing the hue.

Now, some preferred embodiments according to the present invention are hereinafter explained.

Figure 1:
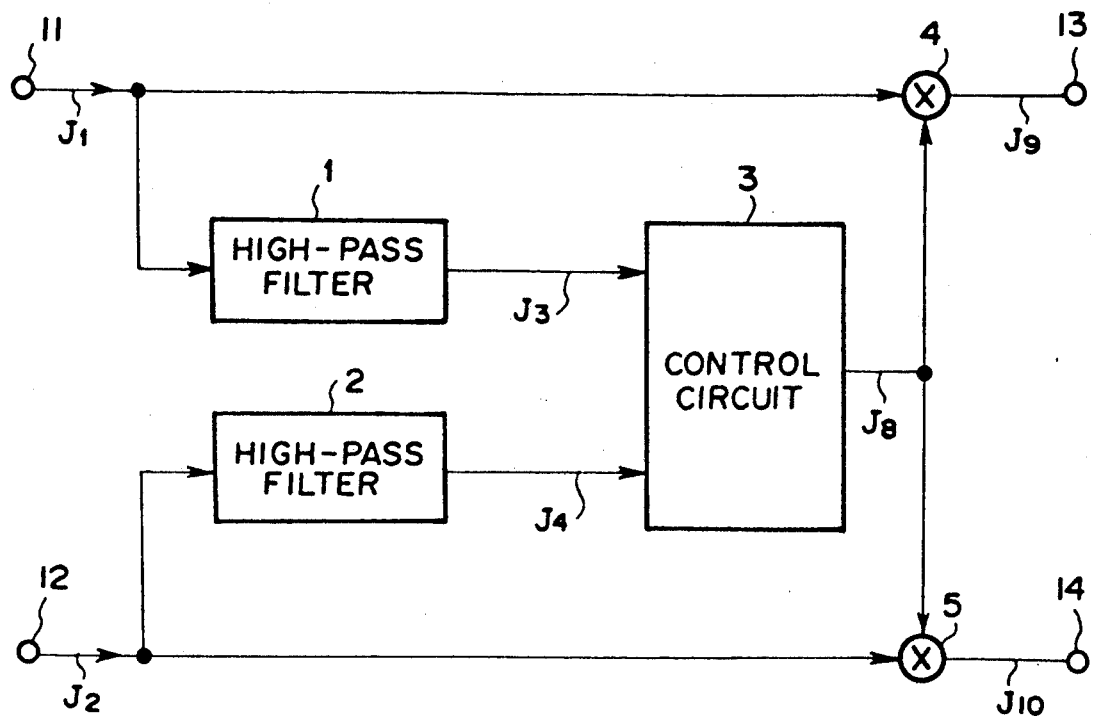
FIG. 1 is a block diagram showing the configuration of a color-signal enhancing circuit according to a first embodiment of the present invention.

FIG. 1 shows in a block diagram a color-signal enhancing circuit of the first embodiment according to the present invention. In this embodiment, the circuit comprises a pair of input terminals 11, 12 receiving the respective input signals; a pair of high-pass filters 1, 2 connected to the respective input terminals 11, 12; a control circuit receiving the outputs of the filters 1, 2; and two multipliers 4, 5 for having the output of the control circuit 3 multiplied with each of the input signals inputted at the input terminals 11, 12 and outputting each of the resultant signals from a pair of output terminals 13, 14. The pair of high-pass filters 1, 2 serve respectively as a pair of frequency region restricting means, and the pair of multipliers 4, 5 serve respectively as a pair of gain control means.

Figure 2:
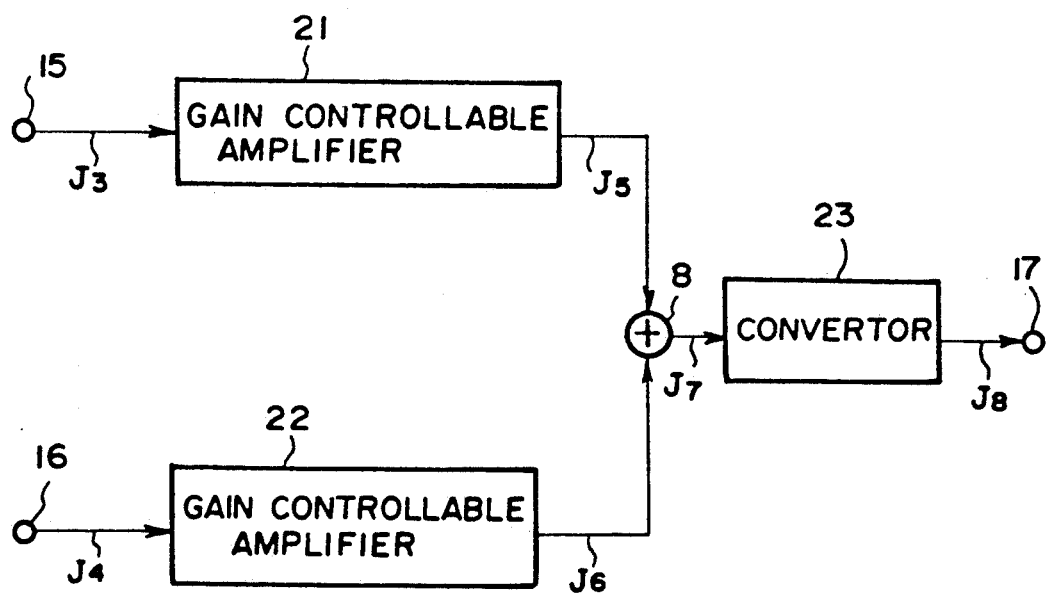
FIG. 2 is a diagram showing a control circuit (CTL) in the circuit of the first embodiment shown in FIG. 1.

FIG. 2 shows, in a block diagram, an example of the control circuit 3 in the circuit of FIG. 1. This control circuit 3 comprises a pair of input terminals 15, 16; a pair of gain controllable amplifiers 21, 22 for giving a predetermined coefficient to each of the signals from the input terminals 15, 16; an adder 8 for adding up the respective outputs from the gain controllable amplifiers 21, 22; and a convertor 23 for giving a predetermined coefficient to the output of the adder 8 and outputting the resultant signal from an output terminal 17.

Figure 3:
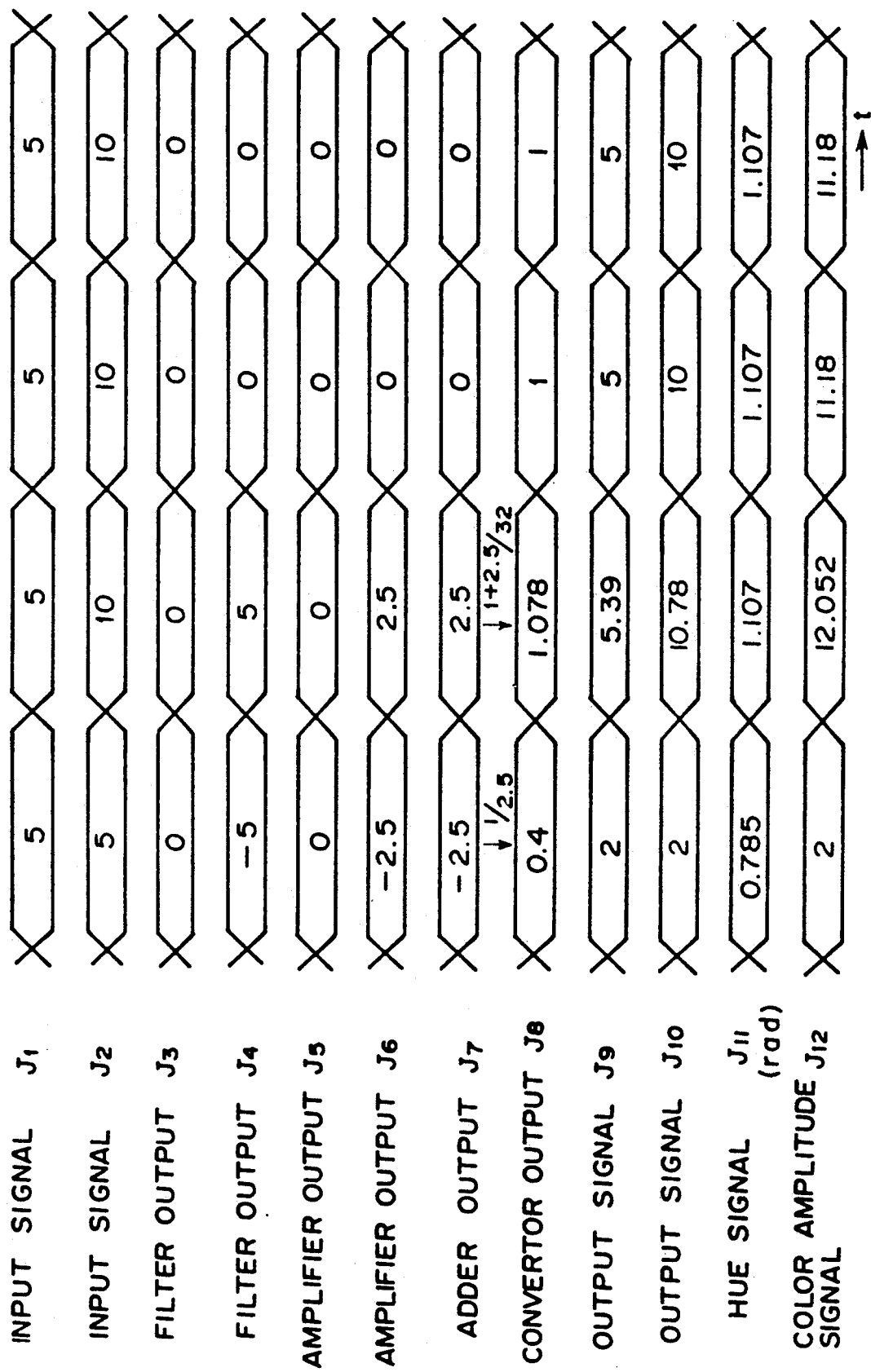
FIG. 3 is a timing chart showing the processing of the respective signals in the first embodiment shown in FIG. 1.

FIG. 3 shows a timing chart of the respective signals processed in the circuit shown in FIGS. 1 and 2, the numerals denoting signal levels of the digital signals.

In the embodiment of FIG. 3, signals $J_1$, $J_2$ represent color difference signals which are inputted to the input terminals 11, 12; signals $J_3$, $J_4$ represent signals which are outputted from the high-pass filters 1, 2; signals $J_5$, $J_6$ represent signals which are outputted from the gain controllable amplifiers 21, 22; a signal $J_7$ represents a signal outputted from the adder 8, that is, the signal outputted from the control circuit 3; signals $J_9$, $J_{10}$ represent signals outputted from the output terminals 13, 14; and signals $J_{11}$, $J_{12}$ represent the hue and the amplitude of the color signals when the signal $J_9$ is B−Y and the signal $J_{10}$ is R−Y.

Here, it is assumed that each of the gain controllable amplifiers 21, 22 has its gain of ½ times and the convertor 23 is to output the signal $J_8 = 1/|J_7|$ when the input is in the negative value and to output the signal $J_8 = 1 + J_7/(J_{7max})$ when the input is in the positive value or 0 (zero). Here, $J_{7max}$ is the maximum value which the signal $J_7$ can take.

As for the input signals $J_1$, $J_2$, their high frequency components are extracted at the high-pass filters 1, 2. These signals $J_3$, $J_4$ of the high frequency components result in the signal $J_7$ after having passed the respective gain controllable amplifiers 21, 22 with their respective gains being controlled thereby and then having been added up at the adder 8. It means that the mean value of the signals $J_3$, $J_4$ of the high frequency components is thus worked out by the gain controllable amplifiers 21, 22 and also the adder 8. The signal $J_7$ is next converted into the signal $J_8$ at the convertor 23, which is inputted to the multipliers 4, 5 and with which the original signals $J_1$, $J_2$ are multiplied, whereby the output signals $J_9$, $J_{10}$ are obtained. In effect, the original input signals $J_1$, $J_2$ are gain-controlled by the mean value of the signals $J_3$, $J_4$ of the high frequency components.

By the process as explained above, it has been made possible that, with the same and single value obtained by the control circuit 3 being multiplied with each of the original input signals $J_1$, $J_2$, only the amplitude $J_{12}$ ($J_{12} = (J_{10}^2 + J_9^2)^{0.5} = a(J_2^1 + J_1^2)^{0.5}$) is changed without changing the hue $J_{11} = \tan^{-1}(J_{10}/J_9)$, that is, $J_{11} = \tan^{-1}(aJ_{10}/aJ_9) = \tan^{-1}(J_{10}/J_9)$ (wherein $a = J_8$), whereby the color signals are enhanced without causing the appearance of any false colors.

Figure 4:
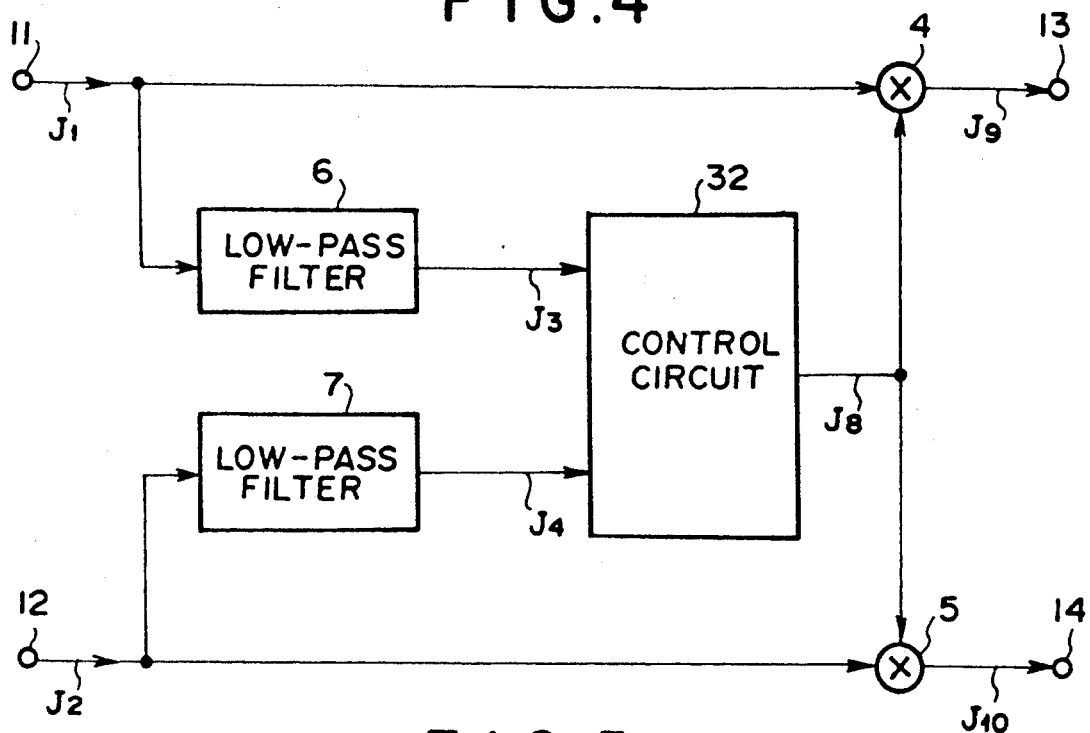
FIG. 4 is a block diagram showing the configuration of a color-signal enhancing circuit according to a second embodiment of the present invention.

FIG. 4 shows, in a block diagram, a color-signal enhancing circuit of the second embodiment according to the present invention. Here, a pair of low-pass filters 6, 7 are used instead of a pair of the high-pass filters 1, 2 of the first embodiment shown in FIG. 1. The remaining circuits other than these low-pass filters 6, 7 of this embodiment are the same as those of the above-explained first embodiment.

In the circuit according to this second embodiment, the signals $J_1$, $J_2$ inputted to the input terminals 11, 12 pass through the low-pass filters 6, 7 where low frequency components of the signals are extracted, and the mean value thereof is obtained at the gain controllable amplifiers 21, 22 and also the adder 8. The output from the convertor 23 is inputted to the multipliers 4, 5 where the inputted gain control signal $J_8$ is multiplied with each of the original input signals $J_1$, $J_2$. In this circuit, when the low frequency components in the original signals are large, the gain of the signal is controlled so as to be made small.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. A color-signal enhancing circuit which comprises:
   a pair of first and second input terminals which respectively receives input color difference signals based on certain image signals;

a pair of first and second frequency region restricting means each of which gives restrictions of a predetermined frequency region to each of said respective color difference signals;

a control circuit which receives outputs from said first and second frequency region restricting means and produces a gain control signal; and a pair of first and second gain control means each of which effects gain-controlling of each of said input signals by using said gain control signal outputted from said control circuit, whereby, with each of said first and second gain control means being controlled by the common and single gain control signal, the color signals based on the image signals inputted are enhanced.

2. A color-signal enhancing circuit according to claim 1, in which said control circuit comprises:

a pair of first and second gain controllable amplifiers each of which gives a predetermined coefficient to each of said outputs from said first and second frequency region restricting means;

an adding means which adds up outputs from a pair of said first and second amplifiers; and a convertor which gives to an output from said adding means a coefficient calculated in a predetermined operation in accordance with the polarity of signals inputted to said convertor and produces said gain control signal.

3. A color-signal enhancing circuit according to claim 1, in which a pair of said first and second frequency region restricting means are a first high-pass filter and a second high-pass filter, respectively.

4. A color-signal enhancing circuit according to claim 1, in which a pair of said first and second frequency region restricting means are a first low-pass filter and a second low-pass filter, respectively.

5. A color-signal enhancing circuit according to claim 1, in which said first and second gain control means are a first multiplier and a second multiplier, each of which multiplies said gain control signal from said control circuit with each of said input signals inputted to each of said first and second input terminals.

6. A color-signal enhancing circuit according to claim 2, in which a pair of said gain control means are multipliers each of which effects gain-controlling of each of said input color difference signals by using said gain control signal from said convertor.

* * * * *